United States Patent

Gercekci et al.

[11] Patent Number: 5,499,338
[45] Date of Patent: Mar. 12, 1996

[54] BUS SYSTEM HAVING A SYSTEM BUS, AN INTERNAL BUS WITH FUNCTIONAL UNITS COUPLED THEREBETWEEN AND A LOGIC UNIT FOR USE IN SUCH SYSTEM

[75] Inventors: Anil Gercekci; Roland H. Schwarz, both of Geneva, Switzerland

[73] Assignee: Motorola, Inc., Schaumburg, Ill.

[21] Appl. No.: 320,590

[22] Filed: Oct. 11, 1994

Related U.S. Application Data

[63] Continuation of Ser. No. 803,819, Dec. 9, 1991, abandoned.

[30] Foreign Application Priority Data

Dec. 19, 1990 [GB] United Kingdom .............. 9027458

[51] Int. Cl.⁶ .................. G06F 11/26; G06F 11/277; H04B 3/46; H04B 17/00
[52] U.S. Cl. .................. 395/183.01; 370/13; 371/20.1; 395/180; 364/932.8; 364/921.8; 364/946; 364/947.2; 364/926.1; 364/927.93; 364/DIG. 2
[58] Field of Search .................. 395/325, 275, 395/800, 575, 183.01, 185.09; 371/15.1, 20.1, 22.6, 25.1, 48; 370/13; 455/67.1; 364/550; 340/825.06; 307/473; 324/73.1

[56] References Cited

U.S. PATENT DOCUMENTS

| | | | |
|---|---|---|---|
| 4,296,464 | 10/1981 | Woods et al. | 364/200 |
| 4,322,794 | 3/1982 | Kurakake | 364/200 |
| 4,339,819 | 7/1982 | Jacobson | 371/16 |
| 4,361,904 | 11/1982 | Matsumura | 455/67.7 |
| 4,453,229 | 6/1984 | Schaire | 364/900 |
| 4,467,418 | 8/1984 | Quinquis | 364/200 |
| 4,720,672 | 1/1988 | Turino | 340/825.62 |
| 4,737,932 | 4/1988 | Baba | 364/900 |
| 4,864,496 | 9/1989 | Triolo et al. | 364/200 |
| 4,907,186 | 3/1990 | Racey | 364/900 |
| 4,928,224 | 5/1990 | Zulian | 364/200 |
| 4,935,894 | 6/1990 | Ternes et al. | 364/900 |
| 5,010,332 | 4/1991 | Egami | 340/825.5 |
| 5,063,494 | 11/1991 | Davidowski et al. | 395/800 |
| 5,101,347 | 3/1992 | Balakrishnan et al. | 395/800 |
| 5,115,435 | 5/1992 | Langford, II et al. | 371/22.3 |
| 5,122,691 | 6/1992 | Balakrishnan | 307/475 |
| 5,153,509 | 10/1992 | Dalrymple et al. | 324/73.1 |

Primary Examiner—Gopal C. Ray
Attorney, Agent, or Firm—Gary W. Hoshizaki; Harry Ibbotson

[57] ABSTRACT

A bus system has a main bus and an internal bus. The main bus is coupled to a number of driver units which drive data onto the main bus and to receiver units which respond to that data and provide response data to the main bus. A logic unit provides two-way communication directly between the main and internal buses and allows testing of individual driver and receiver units independently of other units.

8 Claims, 4 Drawing Sheets

BUS SYSTEM HAVING A SYSTEM BUS, AN INTERNAL BUS WITH FUNCTIONAL UNITS COUPLED THEREBETWEEN AND A LOGIC UNIT FOR USE IN SUCH SYSTEM

This application is a continuation of prior application Ser. No. 07/803,819, filed Dec. 9, 1991, now abandoned.

BACKGROUND OF THE INVENTION

This invention relates to bus system suitable for use in a microcomputer.

In microcomputers it is known to provide a number of functional units which communicate with one another by means of an internal bus, which is dedicated to that functional block of the microcomputer containing those functional units, and which is not directly accessible from the main data bus of the microcomputer. Different functional blocks of the microcomputer may have their own functional units and respective internal buses.

The functional units may be divided into two functional categories namely "drivers" which supply data to the internal bus and "receivers" which receive and respond to the data driven onto the internal bus by the drivers.

A problem rises in such system in respect of testing the function of the units. This is because the drivers and receivers are all tied together by the internal bus, which itself is not accessible from the main bus. Thus it is not possible to test the drivers independently of the receivers and vice-versa.

This problem is exacerbated in modular structures in which driver and receivers may be selected from a library of units and which provide many different permutations of drivers and receivers to customers requirements. This would necessitate the writing of a test sequence for each different possible combination of drivers and receivers.

SUMMARY OF THE INVENTION

This invention seeks to provide a bus system in which the above testing problem is mitigated.

According to the invention there is provided a bus system comprising a main data bus and an internal bus; one or more driver units and one or more receiver units coupled between the main bus and the internal bus, respectively for supplying data to and receiving data from the internal bus and logic means for providing two way access between the main and internal buses whereby individual units may be tested directly by access from the main bus.

The logic means may comprise means coupled to the main bus for storing data to be driven onto the internal bus and a buffer for coupling the means for storing data to the internal bus.

The buffer may be a three state buffer having an enable input and wherein means coupled to the main bus is provided for controlling the enabling of the buffer.

The logic means may include buffer means for coupling data to be read from the internal bus to the main bus.

The buffer means may be a three state buffer and wherein means, coupled to the main bus, is provided for controlling the enabling of the second buffer.

The bus system may comprise a plurality of internal buses, the logic means providing two-way access between the main bus and each internal bus.

In one embodiment the logic means comprises a plurality of logic units, each coupled between the main bus and a respective internal bus.

In another embodiment the logic means comprises a single logic unit and multiplexing means for selectively coupling the main bus to any selected internal bus.

In a preferred embodiment the driver units are timers and the receiver units are action units.

BRIEF DESCRIPTION OF THE DRAWINGS

An exemplary embodiment of the invention will be described with reference to the drawings in which.

DETAILED DESCRIPTION OF THE DRAWINGS

Figure 1:
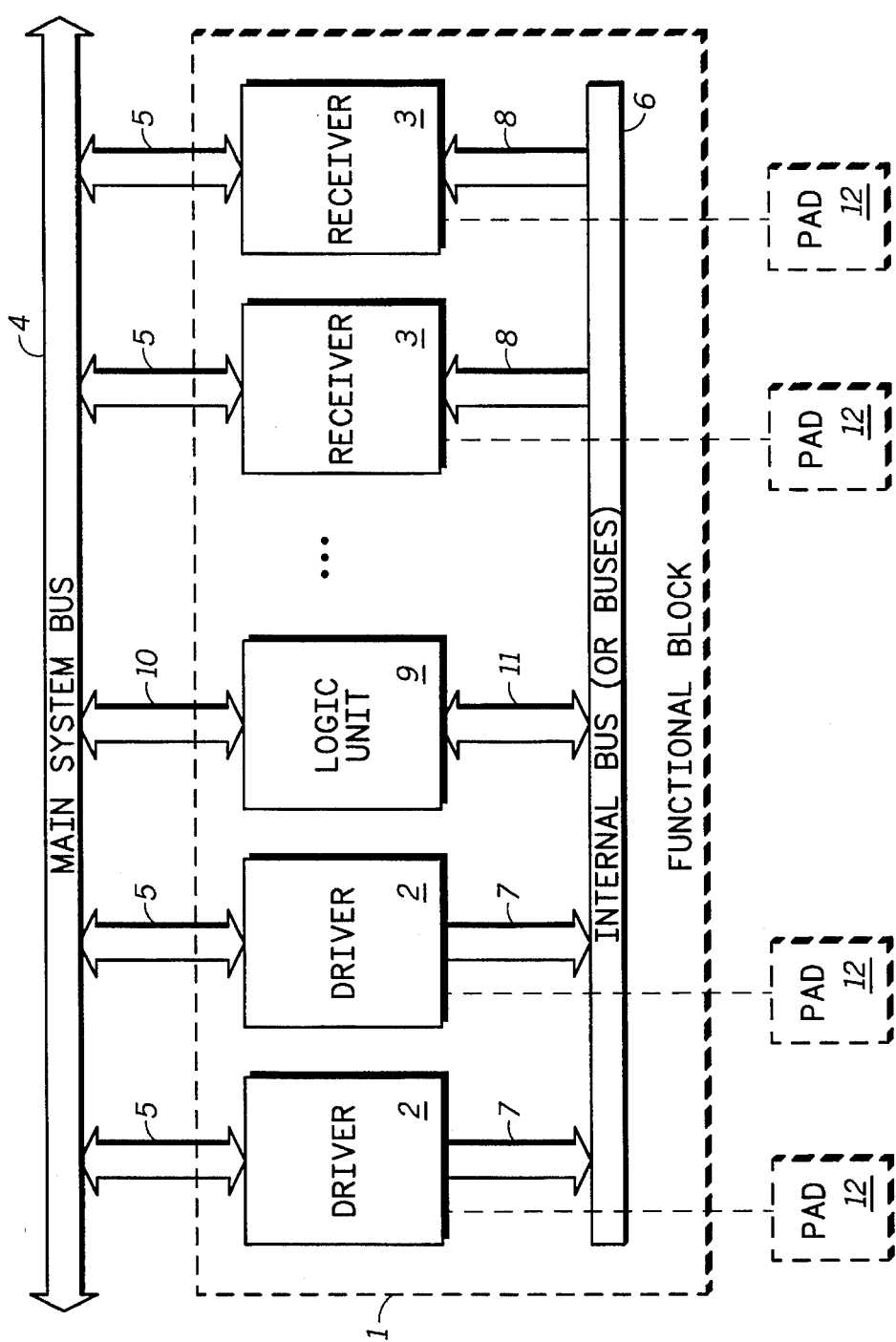
FIG. 1 is a schematic block diagram of one embodiment of a bus system in accordance with the invention.

Referring to FIG. 1 the system shown comprises a functional block 1 including a plurality of driver units 2, which may or may not be identical to one another in function, and a plurality of receiver units 3.

The driver units 2 and receiver units 3 are coupled to a main system bus 4 by two-way buses 5, and to an internal bus 6 by means of one-way buses 7 and 8 respectively, which pass data in the appropriate direction between the internal bus 6 and the respective unit.

The functional block 1 also includes logic means in the form of a logic unit 9 coupled to the main 4 and internal 6 buses by two-way buses 10 and 11 respectively. The logic unit 9 allows two-way access between the main bus 4 and internal bus 6 so that efficient testing of the driver units 2, receiver units 3, and the internal bus 6 itself, may be carried out efficiently.

Each of the driver units 2 and receiver units 3 has an internal bit which may be set from the main bus 4 and which enables and disables the operation of each driver 2 and receiver 3.

When it is desired to test the functional block, the drivers and receivers may be selectively disabled and access provided between the main bus 4 and the internal bus 6 as follows:

To test any individual driver 2 all the drivers 2, and receivers 3 are disabled. The drivers are then enabled one at a time so that each driver in turn drives data onto the internal bus 6. This data may be evaluated through the logic unit 9, which is used to feed the data driven onto the internal bus 6, to the main bus 4.

Similarly to test each receiver 3 independently of other receivers and of the drivers 2, all the drivers 2 are disabled and the receivers 3 are enabled one at a time. Test data is supplied from the main bus 4 through the logic unit 9 to the internal bus, where it is received and actioned by the enabled receiver unit. This receiver unit is examined from the main bus 4 through its two-way connecting bus 5 to determine if it has responded correctly to the data driven onto the internal bus 6 through the logic unit 9.

As an alternative to examining the function of a unit 6 to be tested at the main bus 4, use may be made of external pads shown by dashed boxes 12, of an integrated circuit, of which the functional block 1 typically forms part, and to which the driver units 2 and receiver units 3 are connected.

Thus regardless of the number and function of the drivers 2 and the receivers 3, all their functions may be individually tested. It is possible for there to be a plurality of internal buses in a particular architecture system and each may require addressing from the main bus. Alternative embodiments of such systems are shown in FIGS. 2 and 3, where like parts to those of FIG. 1 have like numbers.

Figure 2:
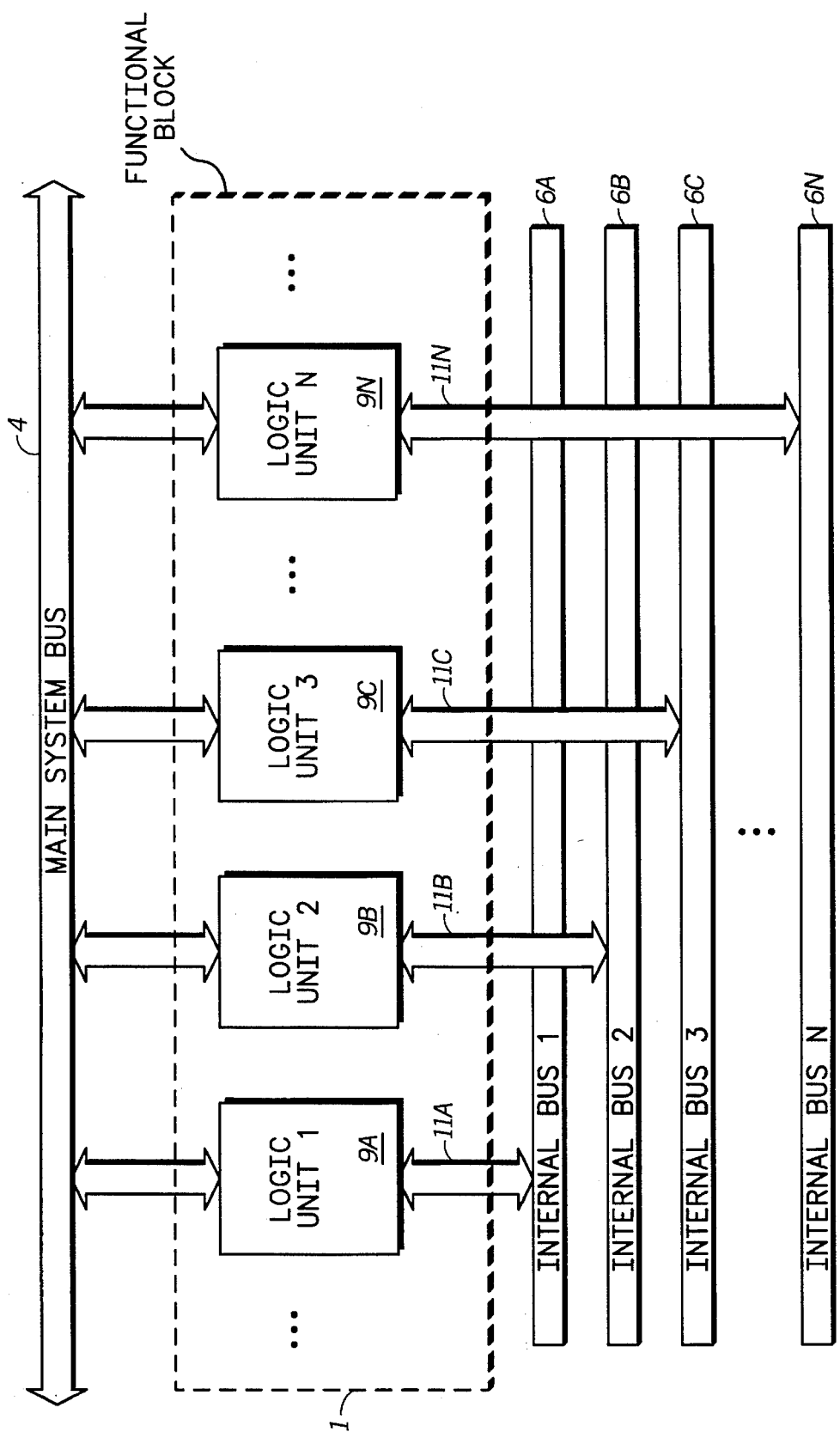
FIG. 2 shows an alternative embodiment of a bus system in accordance with the invention.

In FIG. 2 N internal buses 6A through 6N are provided, each of which has its respective associated logic unit 9A through 9N, for facilitating two-way access between the main bus 4 and each internal bus 6A through 6N. Driver and receiver units are connected as in FIG. 1 between the main and respective ones of the internal buses 6A through 6N.

Figure 3:
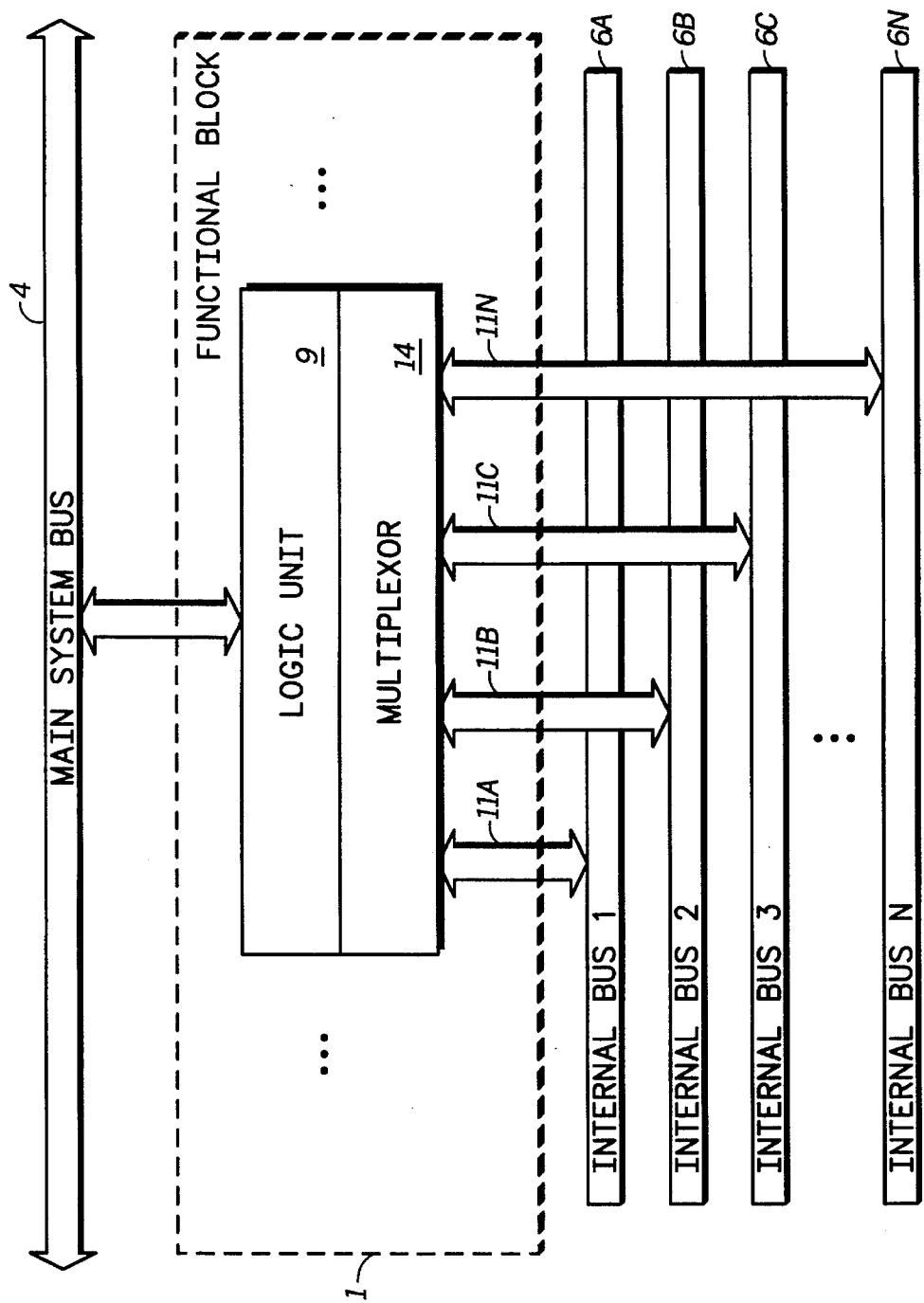
FIG. 3 is another alternative embodiment of a bus system in accordance with the invention.

In the alternative embodiment of FIG. 3, N internal buses 6A through 6N are again provided, but in this case only a single logic unit 9 is provided, which is time shared between the internal buses 6A through 6N, by means of a multiplexer 14, which selectively couples the logic unit 9 to each internal bus 6A through 6N.

Figure 4:
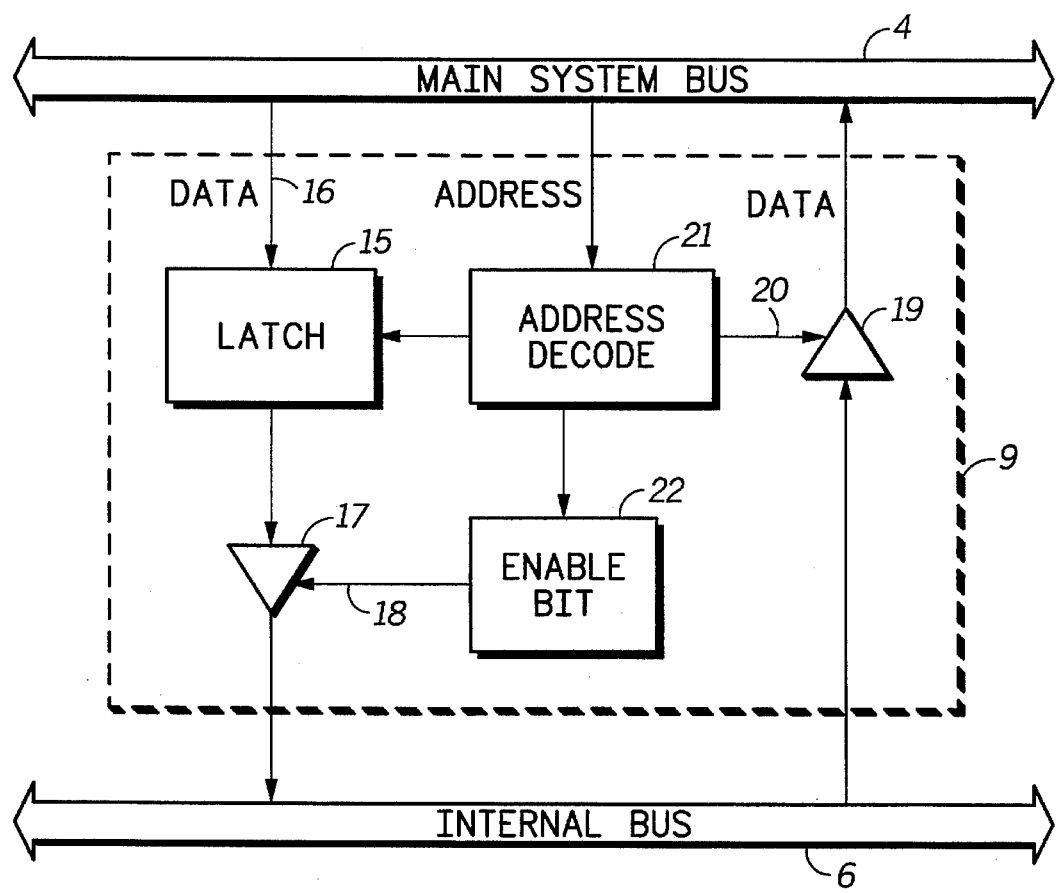
FIG. 4 is a schematic block diagram of the logic unit of FIG. 1 to 3.

Referring now to FIG. 4 the logic unit 9 comprises a data latch 15 coupled to receive data from the main bus over a line 16. The latch is coupled to the internal bus 6 via a three state buffer 17 having an enable input 18.

Communication in the opposite direction between the internal bus 6 and the main bus 4 is effected via a three state buffer 19 having an enable input 20.

To drive data onto the internal bus 6, the latch is selected by means of an address, fed from the main bus 4, to an address decoder 1 which controls enabling of the latch 15. The data is fed to and held in the latch 15, until it is passed to the internal bus 6, by enabling the buffer 17, by means of an enable bit 22, activated from the address decoder 21 and fed to its enable input 18.

To read data from the main bus, the buffer 19 is selected by means of an appropriate address, fed to the address decoder from the main bus 21. The address decoder enables the buffer 19 by means of an input to its enable input 20.

Modifications may be made without departing from the scope of the invention. For example where it is only required to drive data to the internal bus at the same time as the data is written into the latch 15, the enable bit 22 may be omitted.

We claim:

1. A bus system comprising a main data bus, a functional block having one or more unidirectional driver units and one or more unidirectional receiver units, and an internal data bus, the one or more unidirectional driver units and one or more unidirectional receiver units being coupled between the main bus and the internal bus wherein data on the internal bus is not accessible during testing of the one or more unidirectional driver and receiver units, and logic means provides two way test access between the main and internal buses for individual testing of the one or more unidirectional driver and receiver units, wherein the logic means provides driver test data placed on the internal data bus by a driver unit under test to the main data bus for verification of the driver unit functionality, and wherein the logic means provides receiver test data to the internal data bus such that a receiver unit under test receives the receiver test data from the internal bus and transfers the receiver test data to the main data bus for verification of the receiver unit functionality.

2. The system of claim 1 wherein the logic means comprises means coupled to the main bus for storing data to be driven onto the internal bus and a first buffer for coupling the means for storing data to the internal bus.

3. The system of claim 2 wherein the first buffer is a three state buffer having an enable input and wherein means coupled to the main bus is provided for controlling the enabling of the first buffer.

4. The system of claim 3 wherein the logic means includes a second buffer for coupling data to be read from the internal bus to the main bus.

5. The system of claim 4 wherein the second buffer is a three state buffer and wherein means, coupled to the main bus, is provided for controlling the enabling of the second buffer.

6. The system of claim 1 and further comprising a plurality of internal buses, the logic means providing two way test access between the main bus and the internal bus.

7. The system of claim 6 wherein the logic means comprises a plurality of logic units, each coupled between the main bus and a respective internal bus.

8. The system of claim 6 wherein said logic means comprises a single logic unit coupled to the main data bus and multiplexing means coupled between said single logic unit and said plurality of internal buses for selectively coupling the main data bus to any selected internal bus.

* * * * *